United States Patent
Ramadass et al.

(10) Patent No.: US 8,305,050 B2
(45) Date of Patent: Nov. 6, 2012

(54) CIRCUIT AND METHOD TO STARTUP FROM VERY LOW VOLTAGES AND IMPROVE ENERGY HARVESTING EFFICIENCY IN THERMOELECTRIC HARVESTERS

(75) Inventors: Yogesh Ramadass, Cambridge, MA (US); Anantha Chandrakasan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 530 days.

(21) Appl. No.: 12/577,421

(22) Filed: Oct. 12, 2009

(65) Prior Publication Data

US 2010/0270996 A1    Oct. 28, 2010

Related U.S. Application Data

(60) Provisional application No. 61/173,321, filed on Apr. 28, 2009.

(51) Int. Cl.
| | |
|---|---|
| G05F 1/00 | (2006.01) |
| G05F 3/00 | (2006.01) |
| H02J 1/00 | (2006.01) |
| H02J 1/16 | (2006.01) |
| H02J 3/00 | (2006.01) |
| H02J 3/30 | (2006.01) |

(52) U.S. Cl. ...................................... 323/204
(58) Field of Classification Search .................. 323/204; 320/166; 136/205

See application file for complete search history.

(56) References Cited

U.S. PATENT DOCUMENTS 6,232,543 B1 * 5/2001 Nagata ........................... 136/242
2003/0217766 A1 * 11/2003 Schroeder et al. ............ 136/230
(Continued)

FOREIGN PATENT DOCUMENTS
WO    2007149185    12/2007

OTHER PUBLICATIONS

International Search Report and Written Opinion issued in connection with International Patent Application No. PCT/US2010/032505 mailed on Nov. 11, 2010.
Shen et al., "DC-DC Converter Suitable for Thermoelectric Generator" 2005 International Conference on Thermoelectrics, pp. 517-519.
Damaschke, "Design of a Low-Input-Voltage Converter for Thernoelectric Generator" IEEE Transactions on Industry Applications, vol. 33, No. 5, Sep. /Oct. 1997, pp. 1203-1207.

*Primary Examiner* — Jue Zhang
(74) *Attorney, Agent, or Firm* — Gesmer Updegrove LLP (57) ABSTRACT

An energy harvesting system is provided that includes a startup module for starting the energy harvesting system operation from a completely OFF state. The startup module uses mechanical vibrations due to motion to trigger a switch which permits the startup module to charge one or more first capacitive elements so to as reach a first defined voltage. A storage module buffers energy obtained from a thermoelectric harvester to be used by a load device. The storage module commences storing energy from the thermoelectric harvester when the first defined voltage has been reached allowing charging of one or more second capacitive elements to reach a second defined voltage. A DC-DC converter module provides regulated voltage to the load device after energy has been transferred from the thermoelectric harvester. The DC-DC converter module determines whether the second defined voltage has been reached and releases stored energy in the one or more first capacitive elements and the load device.

22 Claims, 9 Drawing Sheets

U.S. PATENT DOCUMENTS

| | | |
|---|---|---|
| 2005/0115600 A1 | 6/2005 | Desteese et al. |
| 2005/0146220 A1* | 7/2005 | Hamel et al. .................... 307/44 |
| 2005/0205125 A1 | 9/2005 | Nersessian et al. |
| 2005/0285728 A1* | 12/2005 | Tyndall ........................ 340/447 |
| 2007/0272293 A1 | 11/2007 | Schmidt |
| 2007/0289620 A1 | 12/2007 | Stark |
| 2007/0291514 A1 | 12/2007 | Shen et al. |
| 2008/0047363 A1* | 2/2008 | Arms et al. .................... 73/862 |

* cited by examiner

CIRCUIT AND METHOD TO STARTUP FROM VERY LOW VOLTAGES AND IMPROVE ENERGY HARVESTING EFFICIENCY IN THERMOELECTRIC HARVESTERS

PRIORITY INFORMATION

This application claims priority from provisional application Ser. No. 61/173,321 filed Apr. 28, 2009, which is incorporated herein by reference in its entirety.

BACKGROUND OF THE INVENTION

The invention is related to the field of energy harvesting, and in particular to a thermoelectric energy harvesting system using low voltages to efficiently harvest energy.

Figure 1:
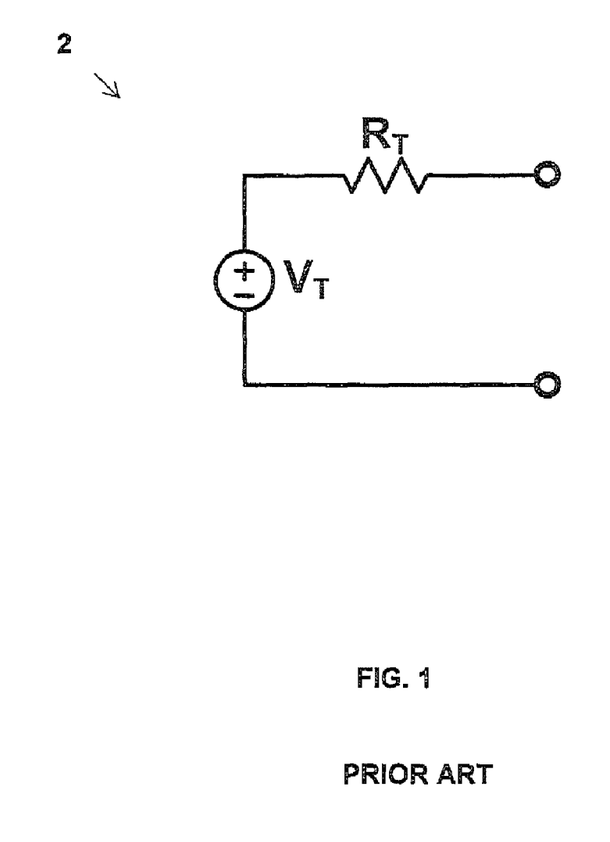
FIG. 1 is a circuit diagram illustrating a model of a thermoelectric harvester.

Energy harvesting is an area of growing importance because of its potential to reduce the usage of batteries in portable electronic devices. Ambient thermal energy can be harvested using thermoelectric means. FIG. 1 shows a typical thermoelectric harvester 2 using temperature differences to produce electrical energy and vice-versa. It can be modeled as a voltage source $V_T$ in series with resistance $R_T$.

The open-circuit voltage output $V_T$ of the harvester 2 is proportional to the temperature difference defined as:

$$V_T = S\Delta T \qquad (1)$$

where S is the Seebeck coefficient of the material and $\Delta T$ is the temperature difference on the thermoelectric device. For most commercial thermoelectric harvesters, the Seebeck coefficient S is in the order of 10-30 mV/K. The harvester 2 can be used to extract electrical power from places with very little temperature difference but the output voltage that can be obtained from the harvester 2 might be as low as 25-50 mV.

The electrical circuit that interfaces with the thermoelectric harvester must be able to operate from this extremely low voltage. Also, batteries must be avoided to reduce cost. This issue presents a problem of how to startup from very low voltages and transfer energy to circuits that are powered by the thermoelectric harvester 2.

Figure 2:
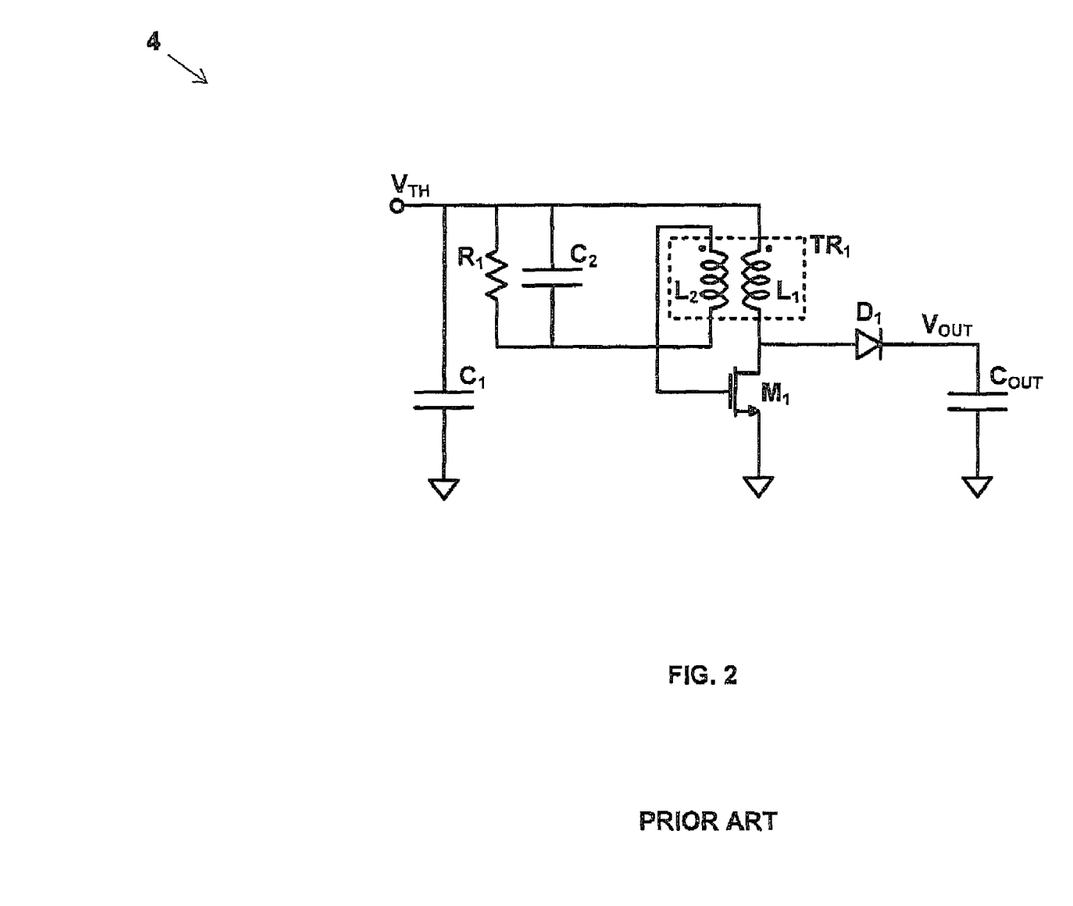
FIG. 2 is a circuit diagram illustrating a commonly known circuit used to startup from low voltages.

FIG. 2 shows a known circuit 4 used to startup from low voltages. In this circuit 4, the essential components are the coupled inductors being coupled to an always-on junction FET (JFET) such as $M_1$. If a small voltage is present at the terminal $V_{TH}$ of the voltage converter, current flows through the primary winding $L_1$ of the transformer $TR_1$. The current is associated with an increasing exponential function and the voltage decreases with the same exponential function. The change of this current is positive, which lead to a positive voltage being induced in the secondary winding $L_2$. The positive terminal of the inductor $L_2$, which is connected to the gate of $M_1$, is driven to a fixed voltage level by the diode of the JFET $M_1$. Also, the negative terminal is shifted to a negative voltage level, charging the capacitor $C_2$ to a negative level. When the current in the primary winding $L_1$ saturates, the deviation and the induced voltage in the secondary winding $L_2$ is zero, which leads to a drop in the secondary voltage.

Eventually, the transistor $M_1$ switches off because the sum of the voltage of capacitor $C_2$ and the secondary winding $L_2$ becomes negative. This leads to the current through the primary inductor to decrease and a positive voltage is induced in the primary winding $L_1$, delaying the current decrease. The output capacitor $C_{OUT}$ is charged via diode $D_1$ because the transistor $M_1$ has a high resistance. The primary current reaches zero which results in the induced voltage in $L_2$ becoming zero and $C_2$ being discharged by $R_1$ to the level of the input voltage. Thus the JFET $M_1$ starts conducting again and the operation cycle repeats.

However, the circuit 4 requires a transformer with a large turns ratio to achieve startup from low voltages. In addition, the JFET transistor $M_1$ is required to be normally ON to supply a large current with 0 $V_{GS}$ and very low $V_{DS}$ (~25 mV). This is extremely difficult to achieve startup using this circuit and not suitable for use with portable devices.

SUMMARY OF THE INVENTION

According to one aspect of the invention, there is provided an energy harvesting system. The system includes a startup module for starting the energy harvesting system operation from a completely OFF state. The startup module uses mechanical vibrations due to motion to activate a switch which permits the startup module to charge one or more first capacitive elements so to as reach a first defined voltage. A storage module buffers energy obtained from a thermoelectric harvester to be used by a load device. The storage module commences storing energy from the thermoelectric harvester when the first defined voltage has been reached allowing charging of one or more second capacitive elements to reach a second defined voltage. A DC-DC converter module provides regulated voltage to the load device after energy has been transferred from the thermoelectric harvester. The DC-DC converter module determines whether the second defined voltage has been reached and releases stored energy in the one or more first capacitive elements and the load device.

According to another aspect of the invention, there is provided a method of energy harvesting. The method includes using a startup module to start the energy harvesting system operation from a completely OFF state. The startup module uses mechanical vibrations due to motion to trigger a switch which permits the startup module to charge one or more first capacitive elements so to reach a first define voltage. Also, the method includes buffering energy obtained from a thermoelectric harvester to be used by a load device using a storage module. The storage module commences storing energy from the thermoelectric harvester when the first defined voltage has been reached allowing charging of one or more second capacitive elements to reach a second defined voltage. Moreover, the method includes providing regulated voltage to the load device after energy has been transferred from the thermoelectric harvester using a DC-DC converter module. The DC-DC converter module determines whether the second defined voltage has been reached and releases stored energy in the one or more first capacitive elements and the load device.

DETAILED DESCRIPTION OF THE INVENTION

The invention provides a thermoelectric energy harvesting system that allows for efficient energy extraction of thermal energy. The inventive thermoelectric harvesting system eliminates the need for batteries used by portable devices altogether and has many applications in areas where very low voltages are output as in thermoelectric energy harvesters, fuel cells, or the like.

Figure 3:
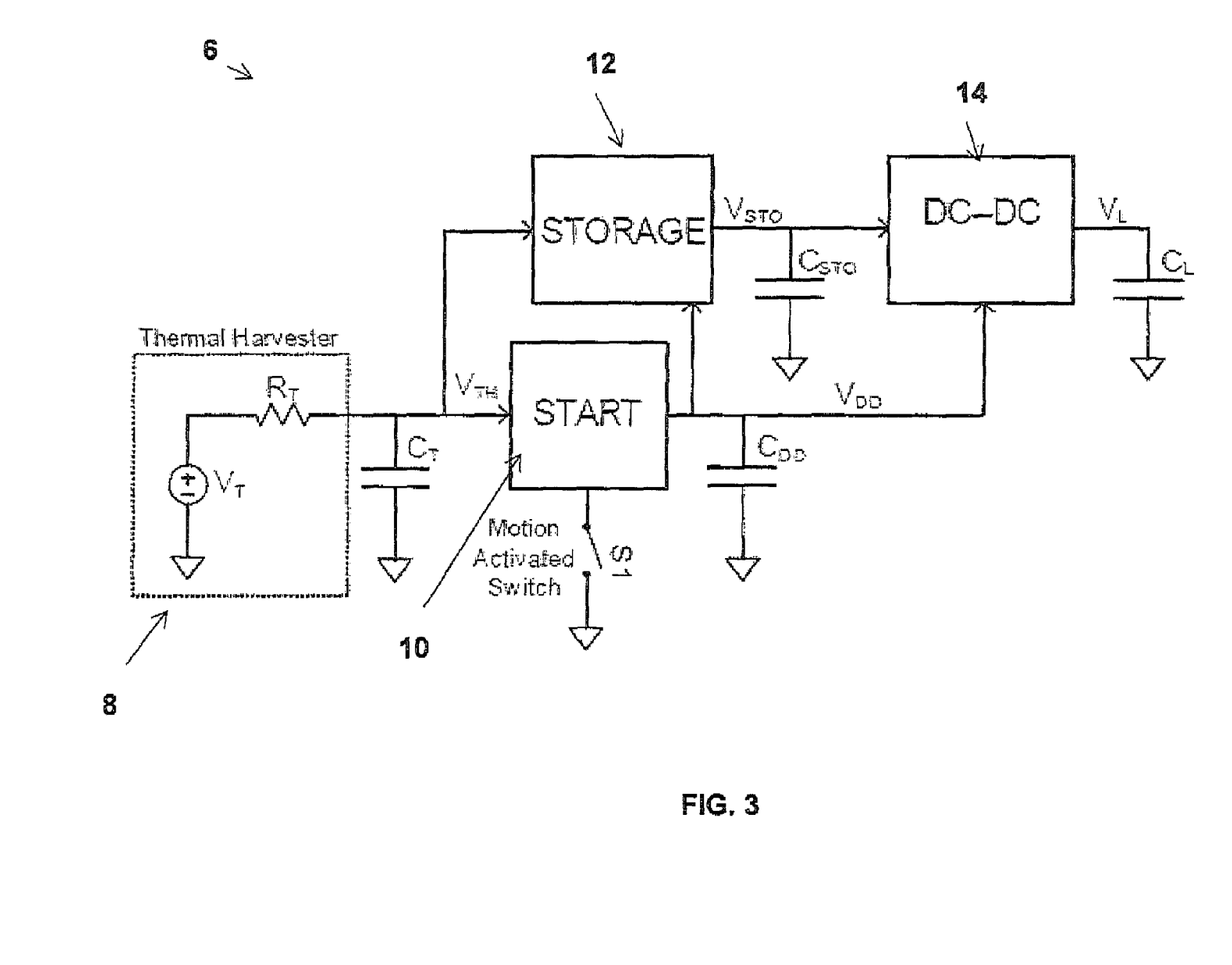
FIG. 3 is a schematic diagram illustrating the architecture of the inventive thermoelectric energy harvesting system.

FIG. 3 shows the architecture of a thermoelectric energy harvesting system 6 in accordance with the invention. The thermoelectric energy harvesting system 6 includes a startup module 10 that starts the system operation from a completely OFF state where the voltage in all the main capacitors is below usable values. The startup module 10 uses mechanical vibration due to motion to trigger switch $S_1$ that permits the startup module 10 to charge $C_{DD}$ above 1V. An internal clock is triggered within the start module 10 powering CMOS switches to allow charge into capacitor $C_{DD}$ through the inductor L. This is repeated as long as $V_{DD}$ is less than 1.8V.

A storage module 12 activates when $V_{DD}$ reaches 1.8V. A storage capacitor $C_{STO}$ is required to be significantly higher than capacitor $C_{DD}$. The storage module 12 acts as a buffer to energy obtained from a thermoelectric harvester 8. It is not permissible to use the voltage $V_{DD}$ to directly power load circuits, as the value of $C_{DD}$ is very small. The voltage across $C_{DD}$ would drain very fast on connecting a significant load current across it. The power from the thermoelectric harvester 8 is directed towards $C_{STO}$ when $V_{DD}$ goes above 1.8V. This essentially builds up the voltage $V_{STO}$. Depending on the power available from the thermoelectric harvester 8 and the power consumed by the load, the voltage $V_{STO}$ can vary based on these factors making it not suitable to directly power load devices.

Constant voltage is attained using a DC-DC converter 14 after the storage capacitor $C_{STO}$ transfer energy to the load at a constant voltage. The DC-DC converter 14 only triggers after $V_{STO}$ goes above 2.4V. The DC-DC converter 14 can be used to regulate $V_L$ to an arbitrarily set voltage and when that occurs the capacitors $C_{DD}$ and $C_L$ are shorted to improve the energy harvesting efficiency of the thermoelectric harvester.

Thermoelectric inputs present an issue when the voltage it outputs for temperature differences is around 25-50 mV. CMOS switches are unable to operate out of these low voltages to use conventional boosting techniques. The voltage available needs to be close to 1V to suitably operate CMOS devices. However, vibrations produced by human or other mechanism can be used for switching purposes. These vibrations are put into use in a mechanically assisted startup circuit 22 shown in FIG. 4.

Figure 4:
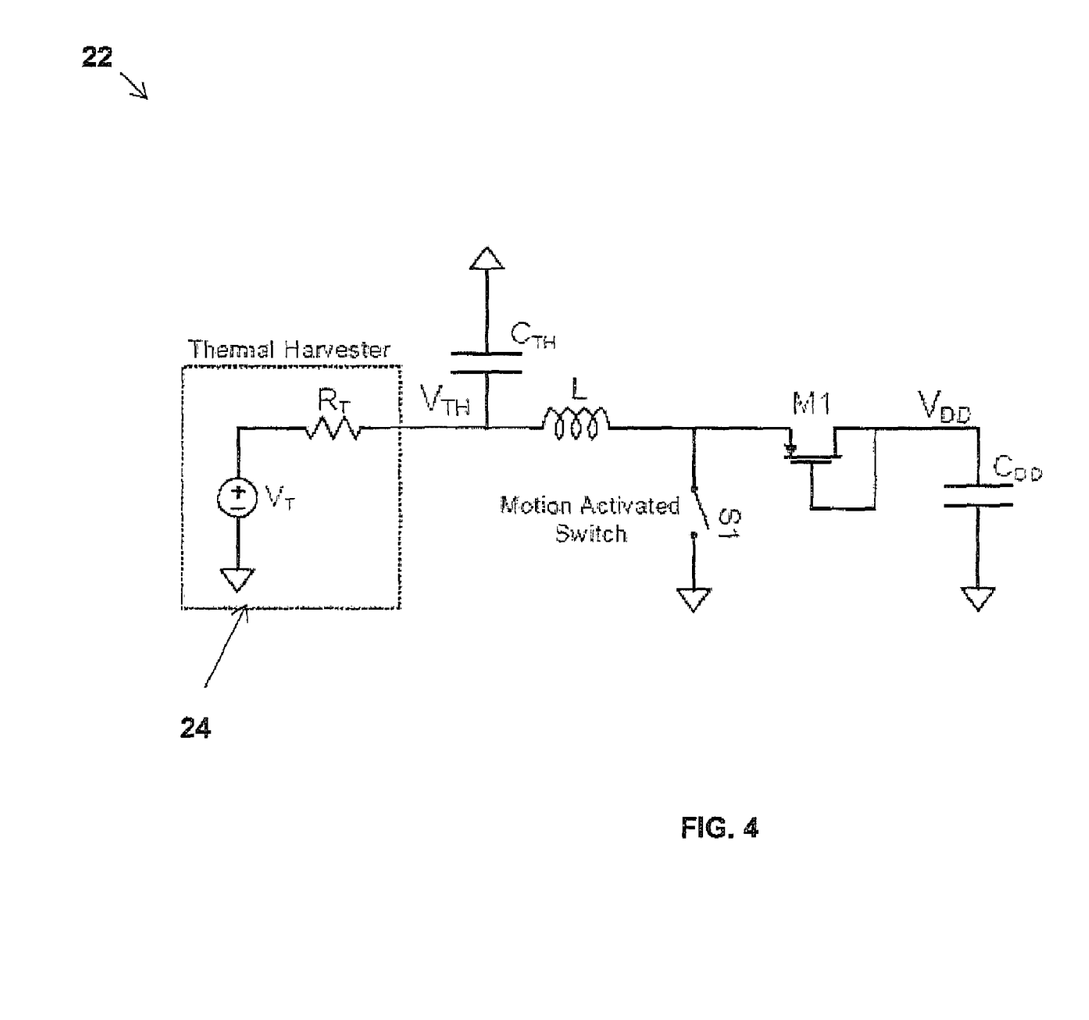
FIG. 4 is a circuit diagram illustrating a mechanically assisted startup circuit.

In particular, FIG. 4 shows the switch $S_1$ being a mechanical switch that turns ON and OFF on the application of very small amount of vibration of less than 0.1 g in acceleration. The vibrations can be induced when a force is applied, for example, by a hand or on the body of a person or any other agent that produces a force. If the switch S is ON, the voltage available from the thermoelectric harvester causes current to flow in the inductor L. If the switch turns OFF, the current in the inductor has to find an alternate path to flow. This action turns ON the transistor $M_1$ which is connected as a diode, and the capacitor $C_{DD}$ is allowed to charge. If the diode is considered ideal, assuming that there was no initial voltage across $C_{DD}$, the voltage obtained at $C_{DD}$ at the end of the ON/OFF cycle is defined as:

$$V_C(\text{final}) = \frac{\sqrt{L/C_{DD}}}{R_T + R_L + R_{SW}} V_T = Q_T V_T \qquad \text{EQ. 1}$$

where $Q_T$ is the Q-factor of the startup network, $R_T$ is the internal resistance of the thermoelectric harvester, $R_L$, and $R_{SW}$ are the parasitic series resistances of the inductor and the switch. $Q_T$ needs to be at least 34 to get more than 1V across $C_{DD}$ with a 30 mV input. In this case, the diode formed by $M_1$ is not ideal and has a voltage drop across it. In addition, $Q_T$ requires to be higher than 34 to get 1V across $C_{DD}$. In the presence of diode losses, the voltage across the capacitor is defined as:

$$V_O(\text{final}) = \sqrt{V_D^2 + Q_T^2 V_T^2} - V_D \qquad \text{EQ. 2}$$

As an example, if $V_D$ is 0.6V, then with a $Q_T$ of 42, the input open circuit voltage needs to be at least 35 mV to obtain a 1V output. In this case, the value of L used is 22 µH and that of $C_{DD}$ is 470 pF. Thermal harvester 24 has a resistance of 5Ω, and the parasitic resistances add up to 1Ω. This gives a $Q_T$ of 42. The voltage gain can be increased by increasing L or decreasing $C_{DD}$. Increasing L too much increases the size of the system and cost. $C_{DD}$ on the other hand cannot be decreased arbitrarily as it needs to have a moderate amount of energy to power circuits. Reducing $V_D$ also helps in decreasing the input voltage required for startup. Synchronous rectifiers cannot be used during startup due to the lack of suitable voltage to turn ON the switches. With a 35 mV of open-circuit voltage that corresponds to a temperature difference of 1.5K across the thermoelectric harvester, which should be feasible in body-worn applications. However, in other embodiments larger open-circuit voltage with higher temperature differences can be used in other applications.

Once $S_1$ turns ON and OFF, the capacitor $C_{DD}$ gets charged to above 1V. After this point the switch $S_1$ is not needed. The voltage across $C_{DD}$ starts off an internal clock generator module which is used to drive on-chip CMOS switches to help transfer power from $V_{TH}$ to $V_{DD}$.

Figure 5:
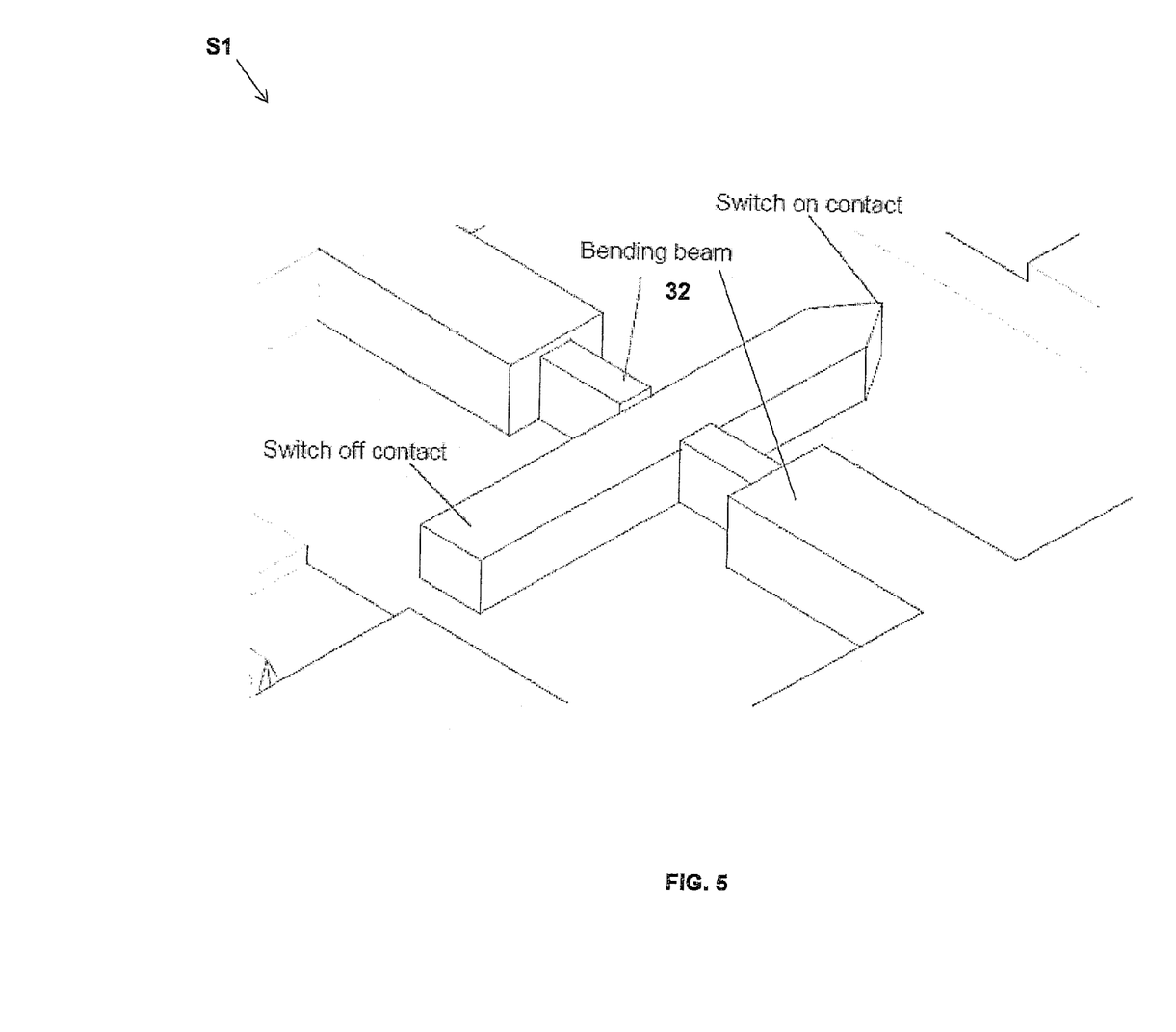
FIG. 5 is a schematic diagram illustrating a mechanical switch used in accordance with the invention.

FIG. 5 shows an example design of a MEMS switch that can be used as the mechanical startup switch $S_1$. The switch is designed to be motion activated. Any slight motion can cause bending beams 32 to twist, which allows the switch $S_1$ to make contact and break it after a short time. This helps to trigger the startup circuit and build voltage across $C_{DD}$. Other designs of motion-activated switches can be thought of and implemented with the harvester interface circuit.

Figure 6A:
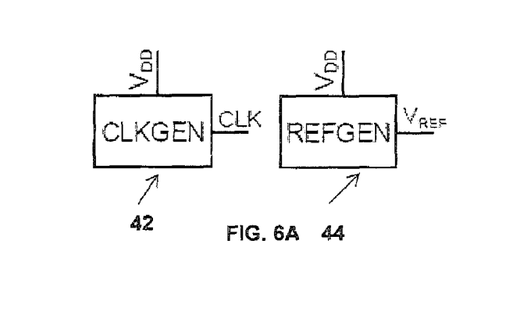
FIGS. 6A-6C are circuit diagrams illustrating the various circuits used by the startup module in accordance with the invention.
Figure 6B:
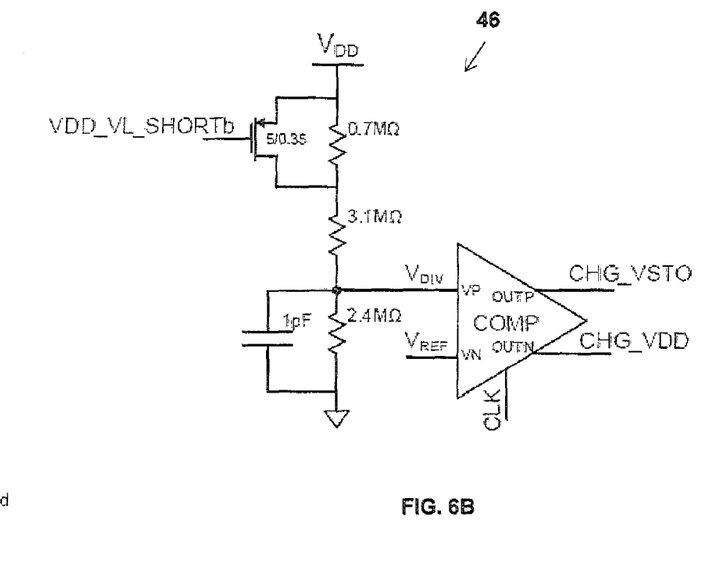
Figure 6C:
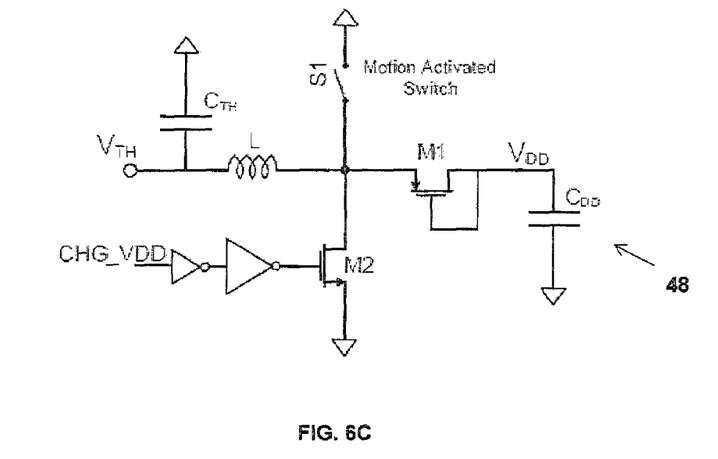

With the help of the mechanical switch $S_1$, the voltage across $C_{DD}$ can be raised to 1V and above. Once this happens, the electronics within the startup module 10 takes over. FIGS. 6A-6C show the circuit elements defining the startup module 10. In particular, FIG. 6A shows a clock generation module (CLKGEN) 42 and voltage reference generation module (REFGEN) 44. The voltage $V_{DD}$ powers the CLKGEN and REFGEN modules. The voltage reference module (REFGEN) 44 generates a voltage $V_{REF}$ being approximately 0.7V which is used as the reference voltage throughout the circuit.

The REFGEN module 44 uses an arrangement having an on-chip P+/N-well diode to generate the reference voltage which stays nearly constant as the input voltage ($V_{DD}$) changes. It is not necessary for $V_{REF}$ to be constant across all $V_{DD}$ as comparisons only take place close to when $V_{DD}$ is around 1.8V. The REFGEN module 44 maintains $V_{REF}$ such that it does not change significantly with changes in $V_{DD}$ or temperature.

$V_{DD}$ simultaneously powers the CLKGEN module 42 shown in FIG. 6A. The CLKGEN module 42 can include multiple delays arranged to form a ring oscillator. The clock frequency is controlled by a 2-bit signal CLK<0:1>. The frequency can be adjusted to correct for process variations and to achieve maximum power transfer. When $V_{DD}$ is charged to above 1V, the CLKGEN module 42 turns ON and outputs the CLK signal. This signal is used to clock the comparator COMP shown in FIG. 6B.

FIG. 6B shows a circuit diagram 46 where a comparison is performed by the comparator COMP using a divided version of $V_{DD}$ ($V_{DIV}$) and the reference voltage $V_{REF}$. It is assumed that the signal $V_{DD}$VL_SHORTb is held high for the moment. As long as $V_{DD}$ is less than 1.8V, the CHG_$V_{DD}$ signal is triggered which is used to transfer energy from the thermal input on to $C_{DD}$. When CHG_$V_{DD}$ goes high, the CMOS switch M2 turns ON and causes current to flow in the inductor L. When the signal CHG_$V_{DD}$ is low that turns the switch M2 OFF thereby turning ON the diode M1 and charging $C_{DD}$. This is repeated whenever $V_{DD}$ falls below 1.8V.

FIG. 6C shows a circuit diagram 48 of the startup circuit used in accordance with the invention in the startup module 10. The startup circuit 48 includes a motion activated switch S1 that is connected to the drain of the CMOS switch M2. The source of the transistor M2 is connected to ground. The gate of transistor M2 is connected to CHG_$V_{DD}$. A capacitor $C_{TH}$ is connected to the thermo harvester output voltage $V_{TH}$. An inductor L is coupled connected the capacitor $C_{TH}$ and switch S1. The source of the diode M1 is connected to the switch S1 and the source of the transistor M2. The gate and drain of the diode M1 is connected to the capacitor $C_{DD}$. Also, the capacitor $C_{DD}$ is connected to ground.

The startup circuit 48 starts in an OFF state where the energy in all the main capacitors is below usable values. Mechanical vibrations due to motion triggers the switch S1 to start the startup module 10. The system starts off and the startup module 10 charges $V_{DD}$ up to 1.8V. When $V_{DD}$ is less than 1.8V, the CHG_$V_{DD}$ signal is triggered which is used to transfer energy from the thermal input on to $C_{DD}$. When CHG_$V_{DD}$ goes high, the CMOS switch M2 turns ON and causes current to flow in the inductor L. CHG_$V_{DD}$ going low turns the switch M2 OFF thereby turning on the diode M1 and charging $C_{DD}$. This is repeated when $V_{DD}$ falls below 1.8V.

Figure 7A:
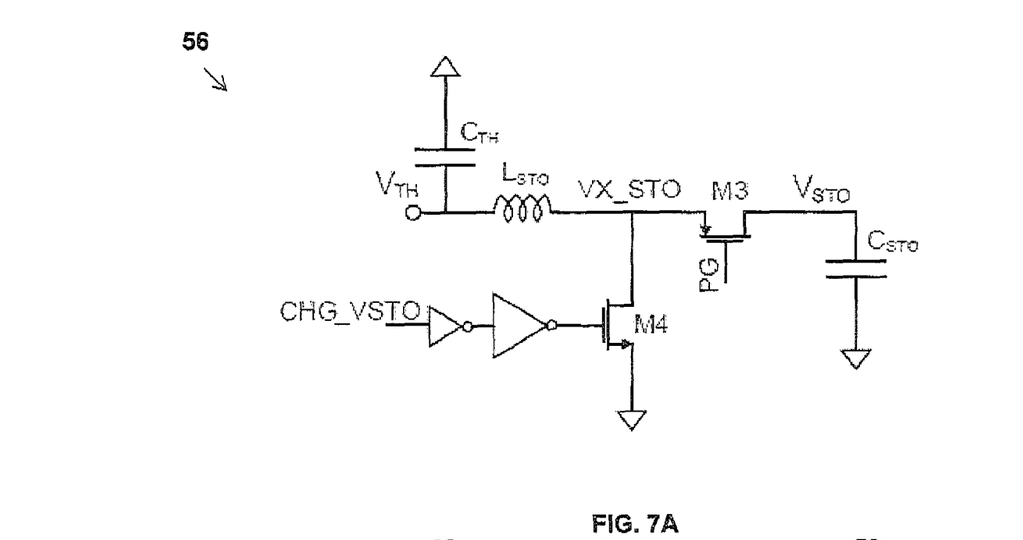
FIGS. 7A-7B are circuit diagrams illustrating the various circuits used by the storage module in accordance with the invention.
Figure 7B:
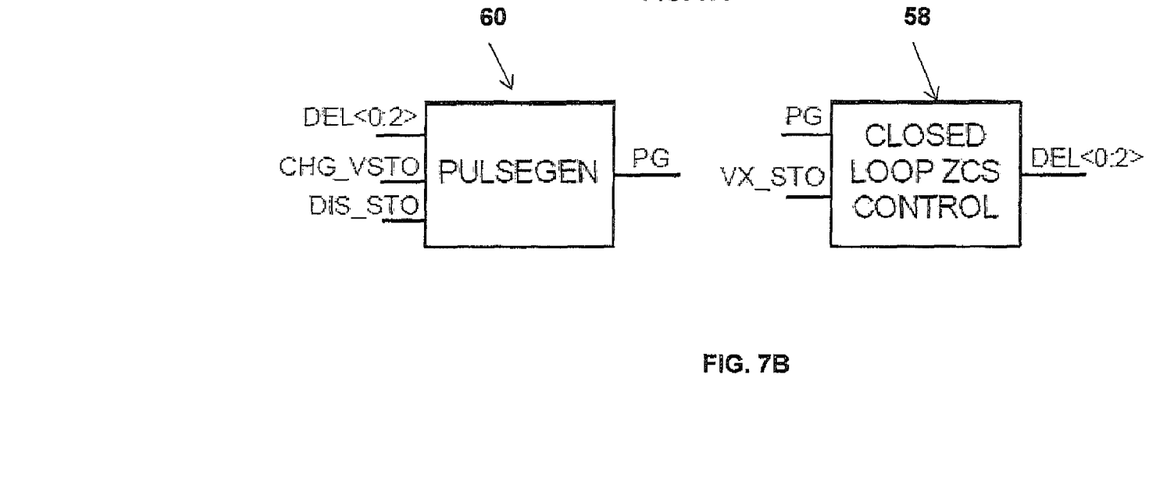

When using thermoelectric harvesters, it is important to retrieve the energy available from the thermal harvester regardless whether the load circuit needs it at that point of time or not. This excess energy can be stored and used at a later time when the load demands increase. An efficient storage module 12 acts as a buffer needing a large amount of capacitance to smoothen the instantaneous power spurts FIGS. 7A-7B show circuit elements that define the storage module 12. In particular, FIG. 7A shows the circuit diagram of a storage circuit 56 used in accordance with the invention. The storage circuit 56 includes a NMOS switch M4 whose drain is connected to an inductor $L_{STO}$. The source of the transistor M4 is connected to ground. The gate of transistor M4 is connected to CHG_VSTO. A capacitor $C_{TH}$ is connected to the thermoelectric harvester output voltage $V_{TH}$ and ground. The inductor $L_{STO}$ is connected to the capacitor $C_{TH}$.

The source of the CMOS transistor M3 is connected to the inductor $L_{STO}$ and the source of the transistor M4. The drain of the CMOS transistor M3 is connected to the capacitor $C_{sto}$. Also, the capacitor $C_{DD}$ is connected to ground. A mechanical switch is not necessary in the storage module 12 because by the time the storage module 12 is activated, there is enough energy across $C_{DD}$ to power the electronics. The power flow path from the thermal harvester to the storage capacitor $C_{STO}$ is similar to that in the startup module 10.

When the storage module 12 is activated $V_{DD}$ goes above 1.8V. During the rising edge of the CLK signal, if the comparator COMP senses that $V_{DD}$ is greater than 1.8V, the CHG_VSTO signal goes high, which turns on transistor M4 of the storage module. This causes current to flow in the inductor $L_{STO}$. When CHG_VSTO goes low, the switch M4 turns OFF. The switch M3 in the storage module is not configured as a diode. The switch is turned ON using a PG signal. The switch M4 needs to be ON long enough for the current in $L_{STO}$ to reach zero. It should then turn OFF.

FIG. 7B shows a zero-current switching (ZCS) module 58 and a PULSEGEN module 60. Both of these modules 58, 60 manage the timing and width of the PG pulse to achieve zero-current switching of the inductor current. The zero-current switching module 58 receives as input the PG signal and a VX_STO signal. The zero-current switching module 58 allows the switch M4 to be ON long enough for the current in $L_{STO}$ to reach zero by increasing or decreasing the pulse width of PG to achieve ZCS of the inductor current. The PULSEGEN module 60 receives as input the CHG_VSTO signal, DIS_STO signal, and a delay signal DEL to produce the PG signal that allows timing for zero-current switching.

Achieving zero-current switching (ZCS) of the current in inductor $L_{STO}$ requires the time for which the switch M4 is ON ($\tau_N$) to be related to the time for which the switch M3 is ON ($\tau_P$) by the following relation:

$$\frac{\tau P}{\tau N} = \frac{V_{TH}}{V_{STO} - V_{TH}} \qquad \text{EQ. 3}$$

In this relation, both the voltages $V_{TH}$ and $V_{STO}$ are variable. The time for which the NMOS switch M4 is ON is fixed by setting it to be equal to the pulse width of the CHG_VSTO signal, which is one-half the time period of the CLK signal.

The width of PG ($\tau_P$) needs to be equal to that given by EQ. 3 to achieve. This is achieved by observing the voltage at the node VX_STO immediately after the switch M3 is turned OFF. If the switch M3 is turned OFF too quick, for example if the pulse width $\tau_P$ is lower than that required, the remaining inductor current in $L_{STO}$ turns ON the parasitic diode across M3. The voltage at VX_STO reaches above VSTO. If the switch M3 is turned OFF too late, the current reverses direction in the inductor $L_{STO}$. This drains the parasitic capacitor on the drain node first before turning ON the parasitic diode across M4. The voltage VX_STO goes below VSTO and eventually to below zero if $\tau_P$ is too large.

Figure 8:
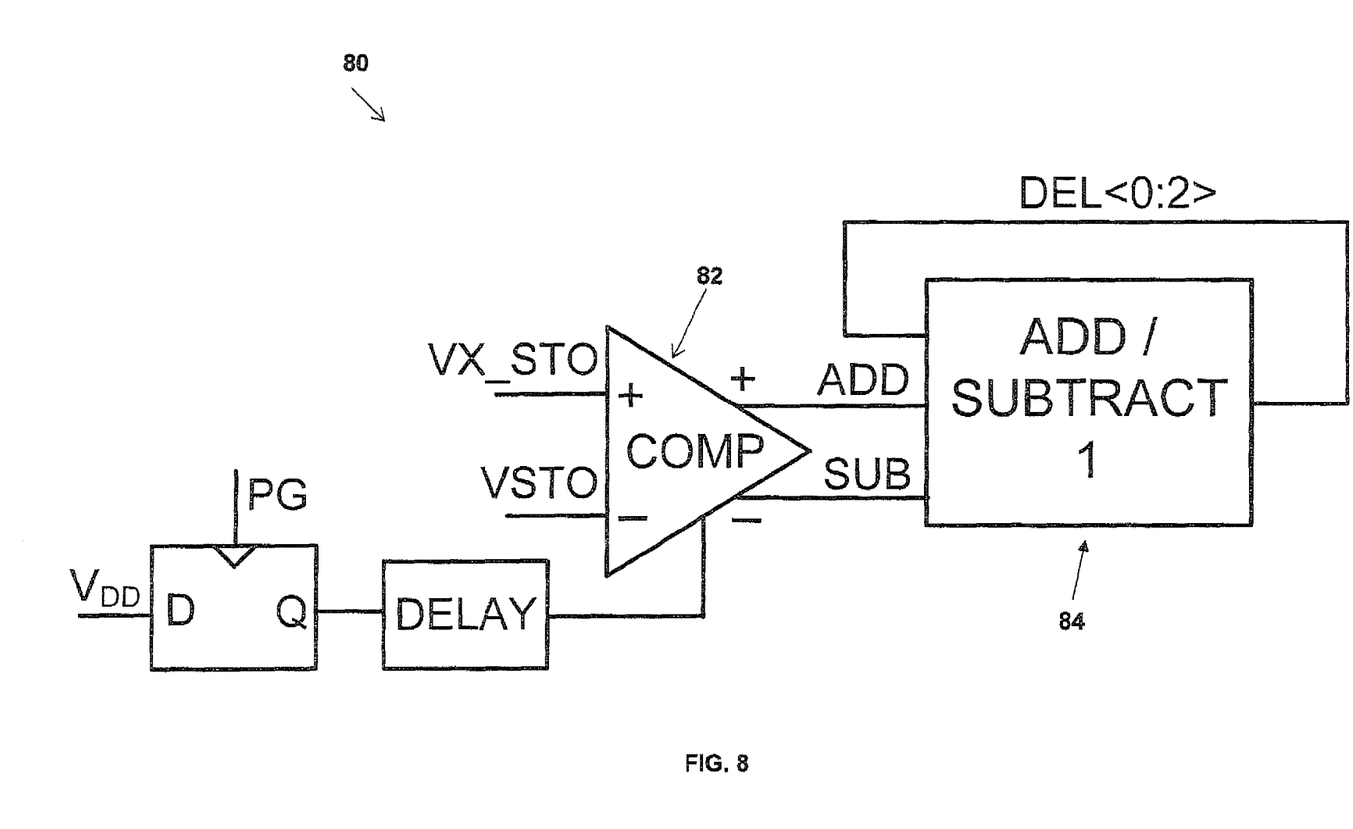
FIG. 8 is a circuit diagram illustrating the closed-loop zero-current switching block used by the storage module in accordance with the invention.

Moreover, one can determine whether the pulse width $\tau_P$ is larger or smaller than necessary by comparing VX_STO with $V_{STO}$. FIG. 8 shows the circuit implementation of the ZCS module 80 which detects and compares this difference. The comparator 82 within the ZCS module performs the comparison within a fixed delay after the rising edge of PG signal. Depending on whether VX_STO is higher or lower than $V_{STO}$, the 3-bit delay signal DEL<0:2> is either incremented or decremented by 1 using the ADD/SUBTRACT 84 block.

The DEL<0:2> signal controls the PULSEGEN module 60 which provides the PG signal. The PG pulse is generated during the falling edge of CHG_VSTO. The width of the PG pulse is controlled using the DEL<0:2> signal. The PULSEGEN module 60 uses a delay line being tapered such that $\tau 1 < \tau 2 < \ldots < \tau 8$. Finer control of the pulse width in the lower order bits and coarser control in the higher order bits is provided. If the delay line is kept uniform, then the resolution of the delay line affects the efficiency of the boost converter much more when the width of PG is small. The delay line is made tapered to keep the percentage increase of the delay almost constant. The DIS_STO signal is used to disable the PULSEGEN module 60 till $V_{STO}$ reaches 1.8V. This is because at low values of $V_{STO}$, the switch M3 cannot be turned ON.

The PG signal is at $V_{STO}$ when the PULSEGEN module 60 is disabled. This makes the switch M3 to behave like a diode and $V_{STO}$ gets charged through the diode M3. The PULSEGEN module 60 can use a comparator which compares $V_{STO}$ with 1.8V and when found to be lower, makes the DIS_STO signal go high. The PULSEGEN module 60 behaves normally when $V_{STO}$ goes above 1.8V and the DIS_STO signal is brought low.

The maximum power that can be obtained from the thermoelectric harvester 2 shown in FIG. 2 can be given by $$P_{max} = \frac{V_T^2}{4R_T} \qquad \text{EQ. 4}$$

EQ. 4 follows the maximum power transfer theory. To get this maximum power, the load circuit and the thermoelectric harvester needs to present an impedance equal to $R_T$. The maximum power can be extracted if the output voltage of the harvester ($V_{TH}$) is regulated close to $V_T/2$.

If the switch M4 is constantly switched ON and OFF with the help of the CHG_VDD signal. The CHG_VDD signal is generated by the comparator COMP, as shown in FIG. 6A, clocked at a frequency fs. When the comparator COMP triggers CHG_VDD at every cycle, then the frequency of CHG_VDD is also fs. Let the pulse width of the ON-time of CHG_VDD be $\tau_n$. This means that the time for which M4 is ON every cycle is $\tau_n$. In steady state $V_{STO}$ is regulated to be much higher than $V_{TH}$. Thus, the time for which the switch M3 is ON is very small compared to $\tau_n$. This can be seen from EQ. 3.

The energy delivered to $C_{STO}$ at every cycle assumes ideal modules being defined approximately as:

$$E_{cycle} = \frac{V_{TH}^2 \tau_N^2}{2L_{STO}} \qquad \text{EQ. 5}$$

This is repeated at every cycle which to leads the energy delivered to $C_{STO}$ to be defined as:

$$P_{STO} = E_{cycle} \cdot f_s = \frac{V_{TH}^2 \tau_N^2}{2L_{STO}} f_s \qquad \text{EQ. 6}$$

The power delivered to $C_{STO}$ during steady state is equal to the power extracted from the thermoelectric harvester. Using EQs. 4 and 6, one can get the following relation:

$$\frac{V_{TH}^2}{R_T} = \frac{V_{TH}^2 \tau_N^2}{2L_{STO}} f_s \Rightarrow \tau_N^2 f_s = \frac{2L_{STO}}{R_T} \qquad \text{EQ. 7}$$

When $\tau_n$ is designed to be one half the period of the CLK signal, then $\tau_n = \frac{1}{2} f_s$. Therefore, under maximum power extraction $f_s$ is defined as:

$$f_s = \frac{R_T}{8L_{STO}} \qquad \text{EQ. 8}$$

By selecting the appropriate $L_{STO}$ and $R_T$, one can extract the maximum power from a thermoelectric harvester. For an $R_T$ of 5Ω and an LSTO of 22 μH, $f_s$ should be 28.4 kHz. The CLKGEN module 42 of FIG. 6A outputs the CLK signal having a frequency $f_s$ in the nominal state. The extra bits of control are provided in the CLKGEN module 42 not only to account for process variations but also to adjust the clock frequency with change in $R_T$ and $L_{STO}$.

The clock frequency can be set to achieve maximum power transfer once an appropriate thermoelectric harvester has been selected. The invention simplifies the means to extract maximum power, instead of using the more complex maximum power tracking loops. Given EQ. 8 is independent of $V_T$, the circuit will settle at the maximum power regardless of changes in $V_T$ due to temperature.

Figure 9:
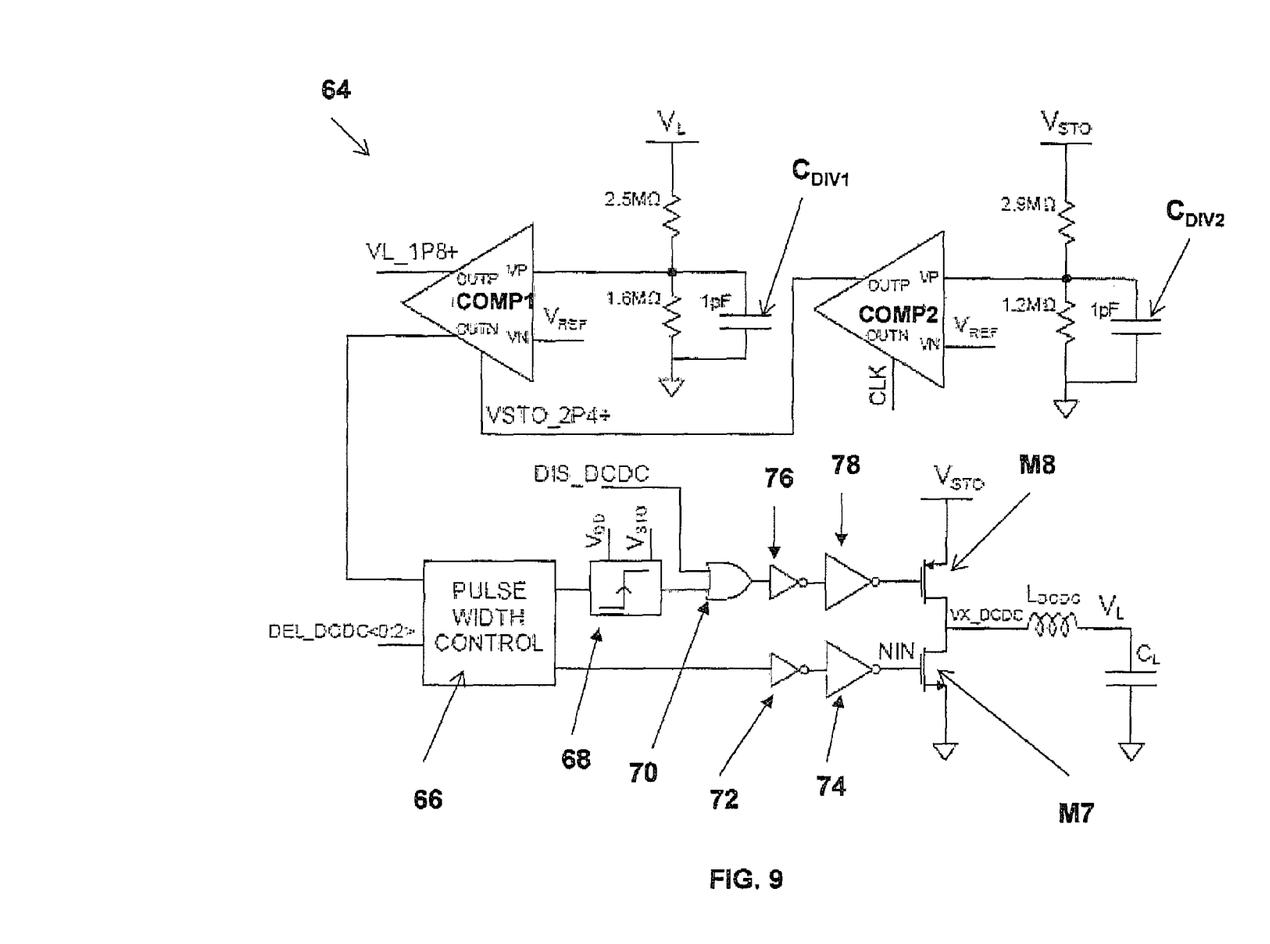
FIG. 9 is a circuit diagram illustrating a circuit used by DC-DC converter module in accordance with the invention.

FIG. 9 shows a circuit arrangement 64 of the DC-DC converter module 14. The circuit arrangement 64 includes two comparators COMP1 and COMP2. The input node VP of COMP1 is connected to resistive divider network having two resistors with resistances of 2.5 MΩ and 1.6 MΩ. A capacitor $C_{DIV1}$ is connected to one of the resistors of the divider network (1.6 MΩ) and ground. The 2.5 MΩ resistive element is connected to voltage $V_L$. The input node VN of COMP1 is connected to voltage $V_{REF}$. The input node VP of COMP2 is connected to another resistive divider network having two resistors with resistances of 2.9 MΩ and 1.2 MΩ. A capacitor $C_{DIV2}$ is connected to one of the resistors of the divider network (1.2 MΩ) and ground. The 2.5 MΩ resistive element is connected to voltage $V_{STO}$. The input node VN of COMP2 is connected to voltage $V_{REF}$. The output node OUTP of COMP2 outputs the VSTO_2P4+ signal and delivers this signal is to the output node OUTN of COMP1. The output node OUTN is connected to the CLK signal. The output node OUTP of COMP1 outputs the signal VL_1P8+.

A pulse-width control module 66 receives as input the signal from the output node OUTN of COMP1 and a delay signal DEL_DCDC. The pulse-width control module 66 provides an output signal to an integrator as input and a NOT gate 72. An integrator 68 also receives as input the signals $V_{DD}$ and $V_{STO}$. The NOT gate 72 provides its output signal to a NOT gate 74. The output signal of the NOT gate 74 is connected to the gate of CMOS power transistor M7. The pulse-width control module 66 provides its output signal to a NOT gate 70. The NOT gate 70 also receives as input the signal DIS_DCDC. The NOT gate 70 provides its output signal to a NOT gate 76. The NOT gate 76 provides its output signal to a NOT gate 78. The output signal of the NOT gate 78 is connected to the gate of the NMOS power transistor M8. The source of M8 is connected to the $V_{STO}$. The drains of the M7 and M8 are coupled at the voltage point VX_DCDC. An inductor $L_{DCDC}$ is connected to the drains of M7 and M8 as well the capacitor $C_L$. Also, the capacitor CL is connected to ground.

The voltage $V_{STO}$ at the output of the storage module 12 is not suitable for power circuits directly because it is unregulated and variable. It is necessary that the DC-DC converter module 14 provides a regulated power to the load elements. The DC-DC converter module 14 regulates the output voltage $V_L$. Also, the DC-DC converter module 14 employs a closed-loop control technique to do zero-current switching of the inductor current. The DC-DC converter module 14 employs pulse-frequency modulation mode of control to regulate $V_L$.

The comparator COMP1's output feeds the clock to comparator COMP2. The DC-DC converter module 14 is designed to be activated only when $V_{STO}$ is above 2.4V. The comparator COMP1 compares a suitably divided version of $V_{STO}$ with the reference voltage $V_{REF}$. Only when $V_{STO}$ goes above 2.4V does the signal VSTO_2P4+ gets activated. The clock to the comparator COMP2 is gated when $V_{STO}$ is less than 2.4V thereby disabling the DC-DC converter module 14. The overhead of using multiple comparators is not too large. The area occupied by the comparator itself is minuscule. Also, the power consumed by them is much less than 1 µW.

The comparator COMP2 is used to regulate $V_L$ to 1.8V. The output voltage is set at 1.8V, but this can be easily changed to an arbitrary value by varying the resistance divider network of the comparator COMP2. When $V_L$ falls below 1.8V, The comparator COMP1 proceeds to send a pulse, via output node OUTN, to the pulse-width control module 66 when $V_L$ falls below 1.8V. This turns ON the power transistors M7, M8 to transfer charge from $V_{STO}$ to $V_L$. The pulse-width control module 66 employs a closed-loop control to achieve ZCS similar to the that described for the ZCS module 58 of FIG. 7A. However, since the control here is for a DC-DC converter module 14, the process of accomplishing ZCS is rather different then the storage module 12. In this case, the voltage at the drain nodes of the power transistors M7 and M8 (VX_DCDC) is compared to ground instead of VX_STO. The comparison takes place immediately after the NMOS power transistor M7 is turned OFF by the pulse-width control module 66. If the NMOS transistor M7 is turned OFF too quick, the remaining inductor current in $L_{DCDC}$ turns ON the parasitic diode across the NMOS transistor M7. This forces the voltage at VX_DCDC to fall to a diode drop below ground.

When the NMOS transistor M7 is turned OFF too late, the inductor current reverses direction and the parasitic diode across the PMOS transistor M8 turns ON after the parasitic capacitance at the drain node gets charged to $V_{STO}$. This brings the voltage VX_DCDC to go above $V_{STO}$. Thus, by comparing VX_DCDC with ground, one can determine whether the NMOS pulse width is larger or smaller than necessary. The comparison takes place a fixed delay after the falling edge of NIN. Depending on whether VX_DCDC is higher or lower than ground. Based on this, the 3-bit delay signal DEL_DCDC is either incremented or decremented by 1. This 3-bit DEL_DCDC signal controls the PULSEGEN module 60, of FIG. 6A, which provides the drive signals for the PMOS M8 and NMOS M7 power transistors. The PMOS ON-time is set to a fixed value. The rising edge of the PMOS M8 pulse triggers the PULSEGEN module 60. The pulse-width control module 66 controls the width of the pulse produced by the PULSEGEN module 60 using the 3-bit DEL_DCDC signal to achieve ZCS.

When $V_{DD}$ reaches 1.8V, the VL 1P8+ signal goes high to short the capacitors $C_L$ and $C_{DD}$. $V_{DD}$ and $V_L$ are shorted and the power to $V_{DD}$ flows through the storage module 12 and not directly from the thermal harvester. This eliminates the time sharing of the thermal input between the startup and storage modules 10, 12. This happens because once $V_L$ and $V_{DD}$ are just above 1.8V, the CHG_VDD signal never gets triggered.

Under this arrangement, the storage circuit 56 of the storage module 12 is always active all the time instead of time-sharing it with the startup circuit 48. The storage circuit 56 can switch at a constant frequency determined by the maximum power transfer considerations.

Thus, efficient operation of the thermoelectric energy harvester circuit is achievable. Also, this arrangement further improves efficiency because transferring power to $V_{DD}$ through the startup module 10 is inefficient owing to using a free-wheeling diode. The shorting is disabled once the voltage $V_{DD}$ falls below 1.6V.

The invention allows thermoelectric elements to harvest thermal energy present in everyday surroundings like on the human body to provide usable electrical power. The voltage output by the thermoelectric elements is proportional to the temperature difference across them. This is of concern while using thermal harvesters in body-worn applications as the voltage output by the harvester is only 25-50 mV in most cases. The invention allows circuits to interface directly with and extract power out of thermoelectric generators. This enables load circuits like processors and radios to operate directly using a thermoelectric generator without the aid of a battery.

Moreover, the invention provides a complete power management solution that could extract electrical power efficiently from the harvester independent of the input voltage conditions. With a regulated output voltage makes it easier to interface to load circuits on the other end. With the help of closed-loop control techniques, the energy processing circuit is able to maintain efficiency over a wide range of load voltage and process variations. The power management solution provided is ideal for low-power applications.

Although the present invention has been shown and described with respect to several preferred embodiments thereof, various changes, omissions and additions to the form and detail thereof, may be made therein, without departing from the spirit and scope of the invention.

What is claimed is:

1. An energy harvesting system comprising:
   a startup module for starting operation from a completely OFF state, said startup module using mechanical vibrations due to Motion to activate a switch that allows charging of one or more first capacitive elements to reach a first defined voltage;
   a storage module for buffering energy obtained from a thermoelectric harvester to be used by a load device, said storage module commences storing energy from said thermoelectric harvester when said first defined voltage has been reached allowing charging of one or more second capacitive elements to reach a second defined voltage;
   a DC-DC converter module for providing regulated voltage to said load device after energy has been transferred from said thermoelectric harvester, said DC-DC converter module determines whether said second defined voltage has been reached and releases stored energy in said one or more first capacitive elements and said load device.

2. The energy harvesting system of claim 1, wherein said startup module comprises a voltage reference module that generates a reference voltage used by said startup module.

3. The energy harvesting system of claim 1, wherein said startup module comprises a clock generation module that generates a clock signal used by said startup module.

4. The energy harvesting system of claim 1, wherein said storage module employs a constant frequency switching scheme dependent on only thermal resistance and storage inductance for maximal transfer of power from the thermoelectric harvester.

5. The energy harvesting system of claim 1, wherein said storage module comprises a closed-loop zero-current switching module for controlling the timing and width of a pulse used to achieve zero-current switching of the current of an inductive element in said storage module.

6. The energy harvesting system of claim 5, wherein said storage module comprises a pulse generator for producing said pulse.

7. The energy harvesting system of claim 1, wherein said DC-DC converter module comprises a pulse-width control module for controlling the width of a pulse used to achieve zero-current switching of the current of a second inductive element in said DC-DC converter module.

8. The energy harvesting system of claim 1, wherein said DC-DC converter module provides a regulated output voltage that can be set arbitrarily.

9. The energy harvesting system of claim 1, wherein said thermoelectric harvester interfaces directly with said startup module and storage module.

10. The energy harvesting system of claim 1, wherein the temperatures differences of said thermoelectric harvester produces outputs as low as 25 mV.

11. The energy harvesting system of claim 1, wherein said mechanical vibrations are produced by motion or actions of a human.

12. A method of energy harvesting comprising:
using a startup module to start the energy harvesting system operation from a completely OFF state, said startup module uses mechanical vibrations due to motion to activate a switch which permits the startup module to charge one or more first capacitive elements so to as reach a first defined voltage;
buffering energy obtained from a thermoelectric harvester to be used by a load device using a storage module, said storage module commences storing energy from said thermoelectric harvester when said first defined voltage has been reached allowing charging of one or more second capacitive elements to reach a second defined voltage;
providing regulated voltage to said load device after energy has been transferred from said thermoelectric harvester using said DC-DC converter, said DC-DC converter module determines whether said second defined voltage has been reached and releases stored energy in said one or more first capacitive elements and said load device.

13. The method of claim 12, wherein said startup module comprises a voltage reference module that generates a reference voltage used by said startup module.

14. The method of claim 12, wherein said startup module comprises a clock generation module that generates a clock signal used by said startup module.

15. The method of claim 12, wherein said storage module employs a constant frequency switching scheme dependent on only thermal resistance and storage inductance for maximal transfer of power from the thermoelectric harvester.

16. The method of claim 12, wherein said storage module comprises a closed-loop zero-current switching module for controlling the timing and width of a pulse used to achieve zero-current switching of the current of an inductive element in said storage module.

17. The method of claim 16, wherein said storage module comprises a pulse generator for producing said pulse.

18. The method of claim 12, wherein said DC-DC converter module comprises a pulse-width control module for controlling the width of a pulse used to achieve zero-current switching of the current of a second inductive element in said DC-DC converter module.

19. The method of claim 12, wherein said DC-DC converter module provides a regulated output voltage that can be set arbitrarily.

20. The method of claim 12, wherein said thermoelectric harvester interfaces directly with said startup module and storage module.

21. The method of claim 12, wherein the temperatures differences of said thermoelectric harvester produces outputs as low as 25 mV.

22. The method of claim 12, wherein said mechanical vibrations are produced by motion or actions of a human.

* * * * *